(12) United States Patent
Shim (10) Patent No.: US 8,339,513 B2
(45) Date of Patent: Dec. 25, 2012

(54) DISPLAY APPARATUS AND CONTROL METHOD THEREOF

(75) Inventor: Jae-seung Shim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1221 days.

(21) Appl. No.: 11/872,096

(22) Filed: Oct. 15, 2007

(65) Prior Publication Data

US 2009/0002572 A1   Jan. 1, 2009

(30) Foreign Application Priority Data

Jun. 28, 2007   (KR) .................. 10-2007-0064772

(51) Int. Cl.
- *H04N 5/04* (2006.01)
- *H04N 17/00* (2006.01)
- *G06F 3/033* (2006.01)

(52) U.S. Cl. ........ 348/511; 348/184; 345/158; 345/162; 345/165; 345/166

(58) Field of Classification Search .................. 348/511, 348/184; 345/158, 162, 165–166
See application file for complete search history.

(56) References Cited

U.S. PATENT DOCUMENTS 6,259,484 B1 *   7/2001   Jiang et al. .................... 348/511
2003/0030757 A1   2/2003   Shim
2007/0040992 A1 *   2/2007   Kim ................................ 353/34
2007/0256102 A1 *   11/2007   Shiina ........................... 725/46

FOREIGN PATENT DOCUMENTS

| JP | 59167860 A | * | 9/1984 |
| JP | 5-191817 A | | 7/1993 |
| KR | 10-2005-0003277 A | | 1/2005 |
| KR | 10-2005-0056395 A | | 6/2005 |
| KR | 2003-0013864 B1 | | 11/2007 |

* cited by examiner

*Primary Examiner* — Hunter B. Lonsberry
*Assistant Examiner* — Gigi L Dubaski
(74) *Attorney, Agent, or Firm* — Sughrue Mion, PLLC (57) ABSTRACT

There is provided a display apparatus which includes a signal processing part which processes a video signal including at a peripheral area thereof a position determining pattern having a plurality of characteristics; a display part which displays a picture on the basis of the video signal processed by the signal processing part; a sensing part which senses the position determining pattern which is included in the video signal; and a control part which controls the signal processing part to adjust a position of the picture displayed on the display part, on the basis of a shift between a characteristic sensed by the sensing part among the plurality of characteristics of the position determining pattern and a predetermined reference characteristic. The position determining pattern has a face shape. Accordingly, the position of the picture can be quickly determined and adjusted.

11 Claims, 7 Drawing Sheets

DISPLAY APPARATUS AND CONTROL METHOD THEREOF

CROSS-REFERENCE TO RELATED APPLICATIONS

This application claims priority from Korean Patent Application No. 10-2007-0064772, filed on Jun. 28, 2007 in the Korean Intellectual Property Office, the disclosure of which is incorporated herein by reference.

BACKGROUND OF INVENTION

1. Field of Invention

The present invention relates to a display apparatus and a control method thereof, and more particularly, to a display apparatus and a control method thereof which can adjust a position of a picture which is displayed.

2. Description of Related Art

In general, a display apparatus is employed for various fields including a monitor, a television, and the like. The display apparatus displays a picture on a screen by processing a video signal which has been input from an external device such as a computer and a DVD, or by processing a broadcast signal which has been received from the outside.

Such a display apparatus is preset in the manufacturing process thereof so that the center of the picture is positioned at the center of the screen. However, during the use of the display apparatus, the center of the picture may be shifted from the center of the screen.

Particularly, a projection television such as a digital light processing (DLP) display apparatus is very likely to have the above problem. For example, if a digital micromirror display (DMD) for image reflection is shifted even minutely from its original place which is preset in the manufacturing process, the center of the picture may be shifted from the center of the screen.

Further, a plastic case which generally forms the exterior of the display may be deformed due to heat, which may cause the picture shift.

Accordingly, it is required to adjust the position of the picture so that the center of the picture can be positioned at the center of the screen.

To this end, Korean Patent No. 2001-48070 discloses a convergence control method of a projection television for adjusting an angle of a reference pattern. In this method, the reference pattern has a line shape and moves within a predetermined range. The brightness level of the reference pattern is sensed by an optical sensor, and a position of the reference pattern having the maximum brightness level is determined, to thereby adjust the position of a picture.

However, in the conventional method, the reference pattern should move several times before the reference pattern passes over the optical sensor, and the optical sensor should sense the reference pattern several times, thereby requiring relatively long time to adjust the position of the picture.

SUMMARY OF INVENTION

Accordingly, it is an aspect of the present invention to provide a display apparatus and a control method thereof which can determine the position of a picture using a position determining pattern of a face shape and quickly adjust the position of the picture.

Another aspect of the present invention is to provide a display apparatus and a control method thereof which can correctly adjust the position of the picture using the face-shaped position determining pattern which has a plurality of parts each having different characteristics.

Additional aspects of the present invention will be set forth in part in the description which follows and, in part, will be obvious from the description, or may be learned by practice of the present invention.

The foregoing and/or other aspects of the present invention can be achieved by providing a display apparatus comprising: a signal processing part which processes a video signal including at a peripheral area thereof a position determining pattern having a plurality of characteristics; a display part which displays a picture on the basis of the video signal processed by the signal processing part; a sensing part which senses the position determining pattern which is included in the video signal; and a control part which controls the signal processing part to adjust a position of the picture displayed on the display part, on the basis of a shift between a characteristic sensed by the sensing part among the plurality of characteristics of the position determining pattern and a predetermined reference characteristic.

The position determining pattern may have a face shape.

The plurality of characteristics of the position determining pattern may comprise different brightness levels.

The signal processing part may comprise a pattern generating part which generates the position determining pattern, and the control part may control the pattern generating part to generate the position determining pattern in an over scan area of the video signal.

The display apparatus may further comprise a memory part which stores information on the shift between each characteristic of the position determining pattern and the reference characteristic. The control part may determine the information on the shift between the characteristic of the position determining pattern sensed by the sensing part and the reference characteristic from the memory part, and adjust the position of the picture displayed on the display part on the basis of the determined information.

The sensing part may have a light shield structure to form a sensing gap.

The foregoing and/or other aspects of the present invention can be also achieved by providing a method of controlling a display apparatus, comprising: processing a video signal including at a peripheral area thereof a position determining pattern having a plurality of characteristics; displaying a picture on the basis of the processed video signal; sensing the position determining pattern; and adjusting a position of the picture on the basis of a shift between a sensed characteristic among the plurality of characteristics of the position determining pattern and a predetermined reference characteristic.

The position determining pattern may have a face shape.

The plurality of characteristics of the position determining pattern may comprise different brightness levels.

The processing the video signal may comprise generating at least one position determining pattern in an over scan area of the video signal.

The method may further comprise: storing information on the shift between each characteristic of the position determining pattern and the reference characteristic. The adjusting the position of the picture may comprise: determining the information on the shift between the sensed characteristic of the position determining pattern and the reference characteristic; and adjusting the position of the picture on the basis of the determined information.

The processing the video signal may comprise generating at least one position determining pattern in an over scan area of the video signal.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Reference will now be made in detail to embodiments of the present invention, examples of which are illustrated in the accompanying drawings, wherein like reference numerals refer to like elements throughout. The exemplary embodiments are described below so as to explain the present invention by referring to the figures.

Figure 1:
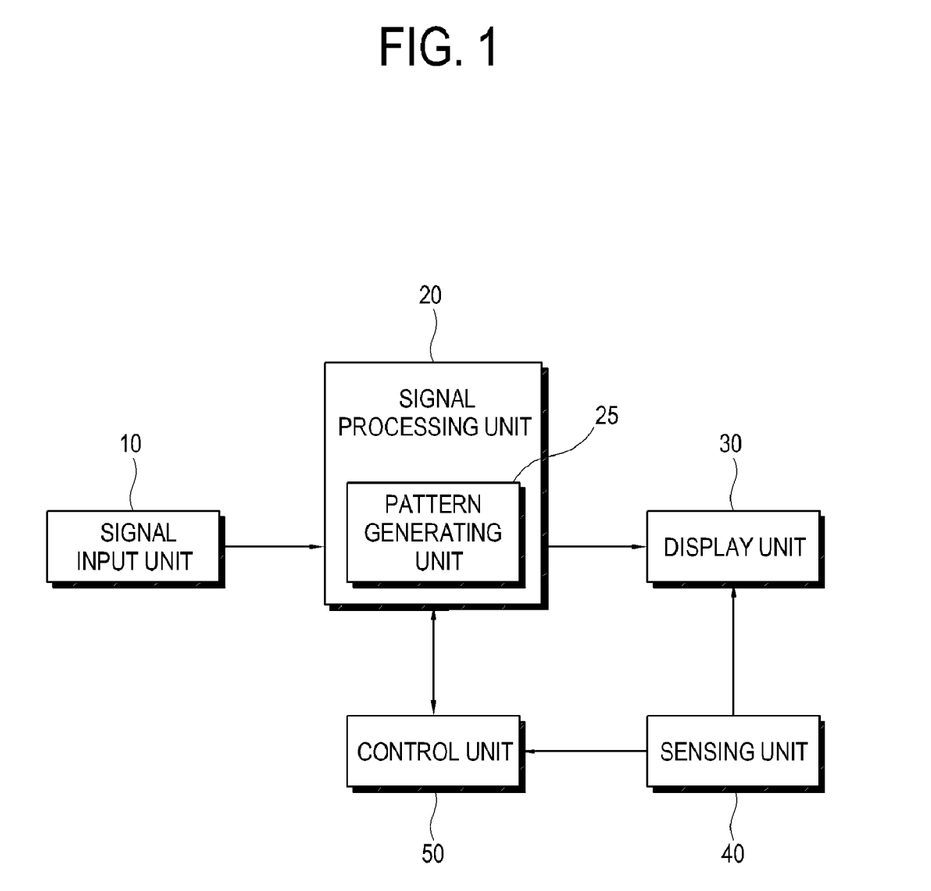
FIG. 1 is a control block diagram illustrating a display apparatus according to an exemplary embodiment of the present invention.

Referring to FIG. 1, a display apparatus according to an exemplary embodiment of the present invention includes: a signal input part 10, a signal processing part 20, a display part 30, a sensing part 40, and a control part 50.

The signal input part 10 is to be provided with a video signal from an external device, and includes a tuner (not shown) which receives a broadcast signal and a connector unit (not shown) through which the video signal is inputted from the external device.

The connector unit may include a variety of connectors to allow video signals having a variety of formats to be inputted therethrough, for example, a D-sub connector for input of a video signal, a CVBS (composite video broadcast signal) connector, an S-video connector, a component connector, or the like.

The signal processing part 20 processes the video signal inputted through the signal input part 10 under the control of the control part 50, and provides the processed video signal to the display part 30 to be displayed.

The signal processing part 20 may perform a variety of functions corresponding to the various formats of the inputted video signals, for example, an A/D converting function to convert the video signals having various formats into a digital video signal having a certain format, a digital decoding function, a scaling function to adjust vertical frequency, resolution, picture ratio, etc. to meet an output specification of the display part 30 with respect to the inputted digital video signal and/or analog video signal, and a predetermined format converting function.

The signal processing part 20, as shown in FIG. 1, includes a pattern generating part 25.

The pattern generating part 25 generates at least a position determining pattern to determine the position of a picture displayed on the display part 30. Here, the position determining pattern has a face shape, which has a plurality of parts each having different characteristics. For example, the characteristics may include different brightness levels, contrast levels, letters, or the like.

Figure 2A:
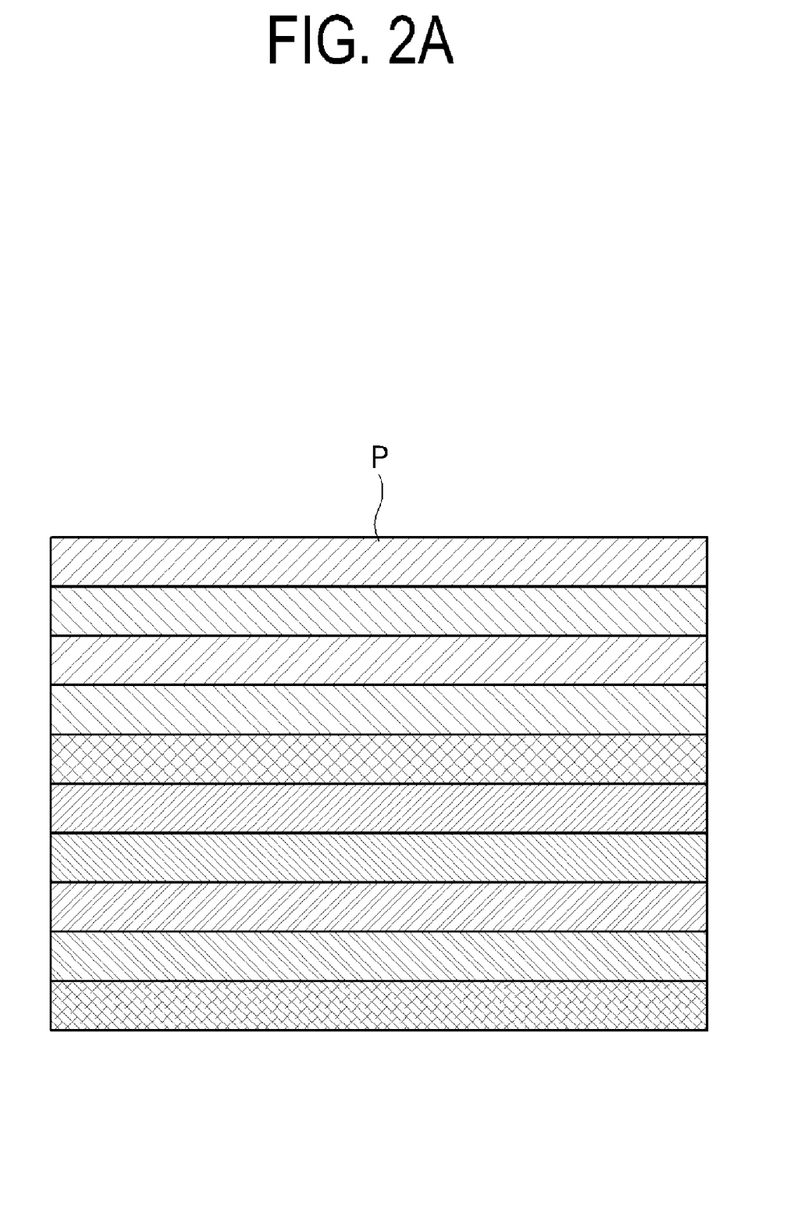
FIGS. 2A and 2B illustrate an example of a position determining pattern, according to an exemplary embodiment of the present invention.
Figure 2B:
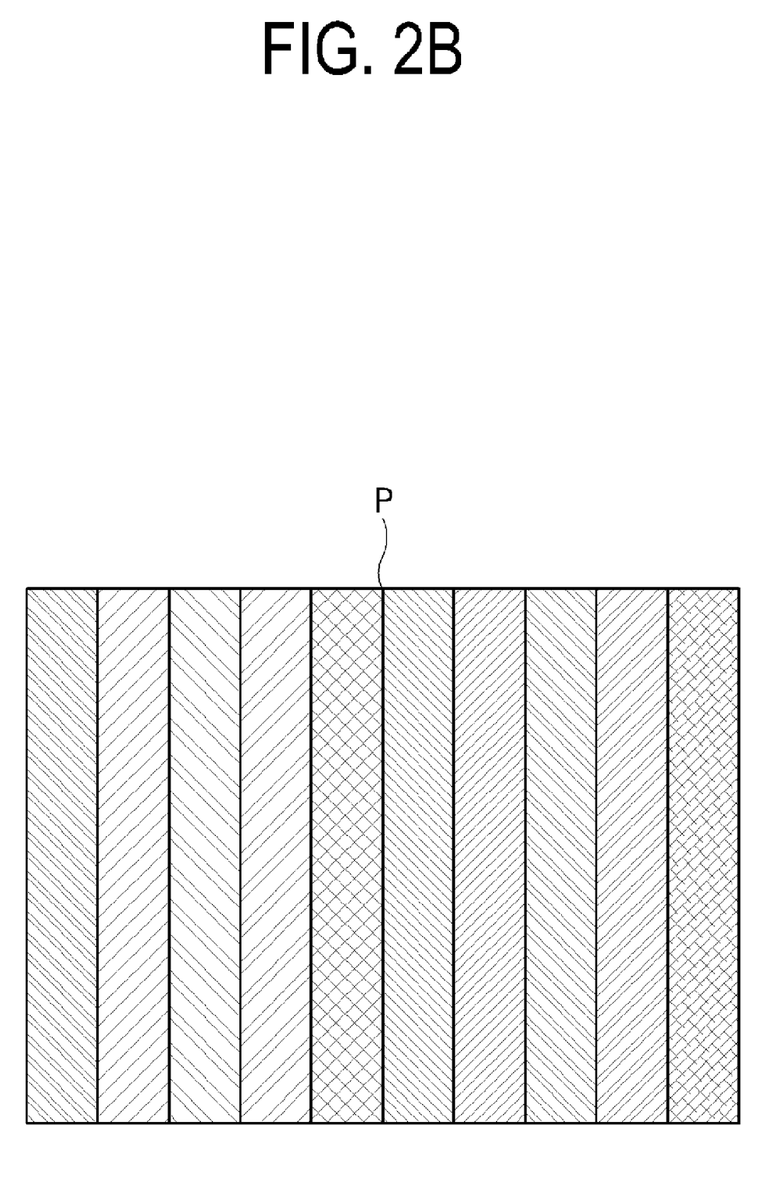

FIGS. 2A and 2B illustrate an example of a position determining pattern P generated by the pattern generating part 25. As shown, in this example, the position determining pattern P has a plurality of parts each having different brightness levels.

As shown in FIG. 2A, the parts of the position determining pattern P may have different brightness levels at a regular interval, which decreases going downward. Alternatively, as shown in FIG. 2B, the parts of the position determining pattern P may have different brightness levels at a regular interval, which decreases going rightward.

Figure 3:
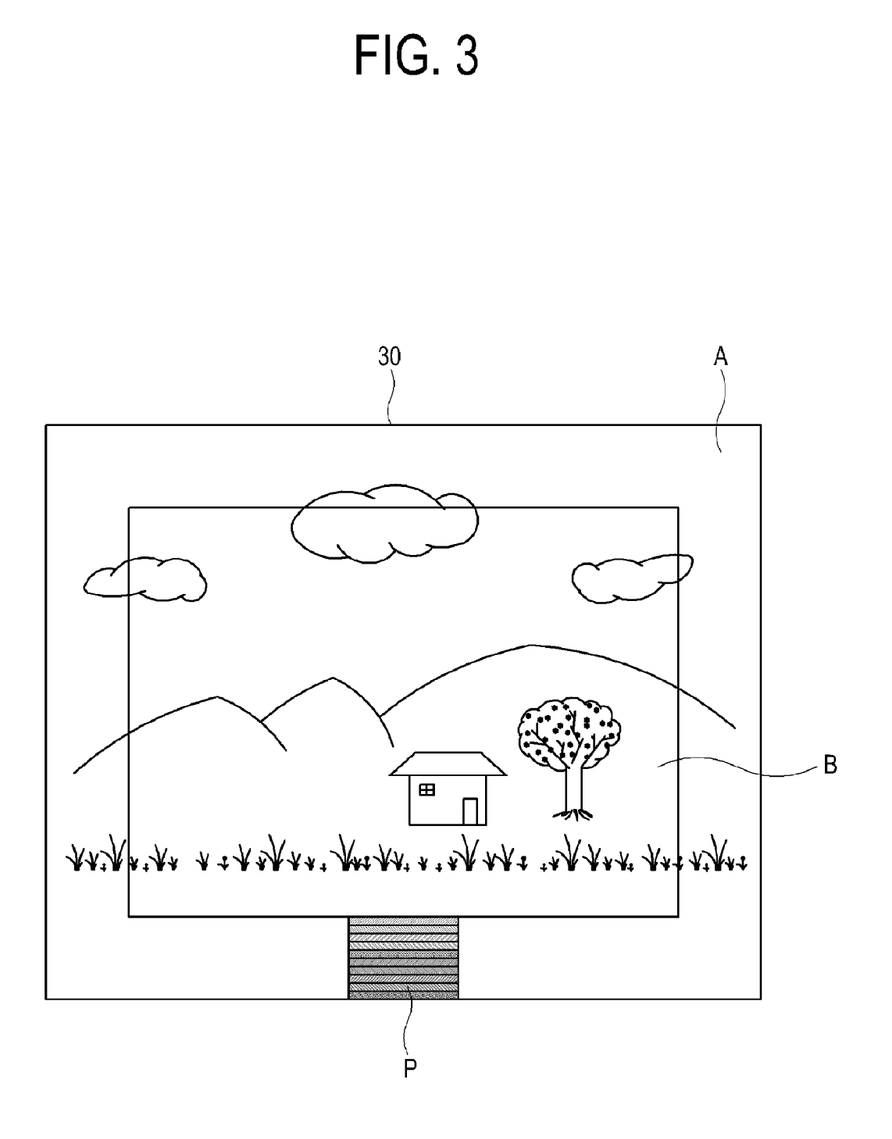
FIG. 3 illustrates the position determining pattern which is included in an over scan area of a picture, according to an exemplary embodiment of the present invention.

The position determining pattern P generated by the pattern generating part 25 is overlapped in a peripheral area of the video signal processed by the signal processing part 20 under the control of the control part 50, as shown in FIG. 3, which will be described later.

The display part 30 displays a picture including the position determining pattern P processed through the signal processing part 20, and may be provided as a DLP, an LCD, a PDP, or the like.

The sensing part 40 is arranged in an over scan area of the display part 30, and senses the position determining pattern P which is included in the picture displayed on the display part 30. The sensing part 40 may be provided as a sensor-IC, an optical sensor, or the like. The sensing part 40 provides the sensed characteristic of the position determining pattern P to the control part 50.

Figure 4:
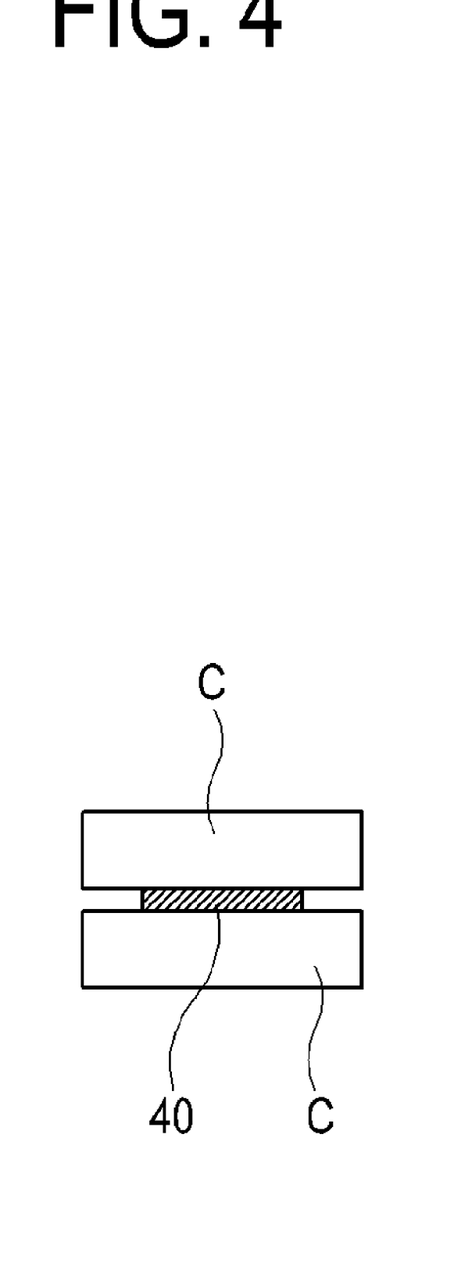
FIG. 4 illustrates an example of a sensing part, according to an exemplary embodiment of the present invention.

The sensing part 40 may be interposed between a pair of light shields C being attached on opposite sides thereof to form a sensing gap, as shown in FIG. 4, so as to prevent the sensed result from being affected by peripheral light, etc. when the sensing part 40 senses the position determining pattern P.

The display apparatus according to the present embodiment may further include an analog-digital converter (not shown) to convert analog data into digital data so that the control part 50 can read the brightness level sensed by the sensing part 40.

The control part 50 adjusts the position of the picture displayed on the display part 30 on the basis of the characteristic of the position determining pattern P sensed by the sensing part 40. The control part 50 may be provided as a CPU, a microcomputer, or the like.

More particularly, the control part 50 controls the signal processing part 20 to process the video signal inputted through the signal input part 10. At this time, the control part 50 controls the pattern generating part 25 to generate the position determining pattern P in a peripheral area of the video signal processed by the signal processing part 20.

As shown in FIG. 3, the video signal processed by the signal processing part 20 includes a visual area B displayed on the display part 30, and an over scan area A in a peripheral area thereof which is not displayed on the display part 30. The control part 50 controls the pattern generating part 25 to generate the position determining pattern P in the over scan area A.

Figure 5:
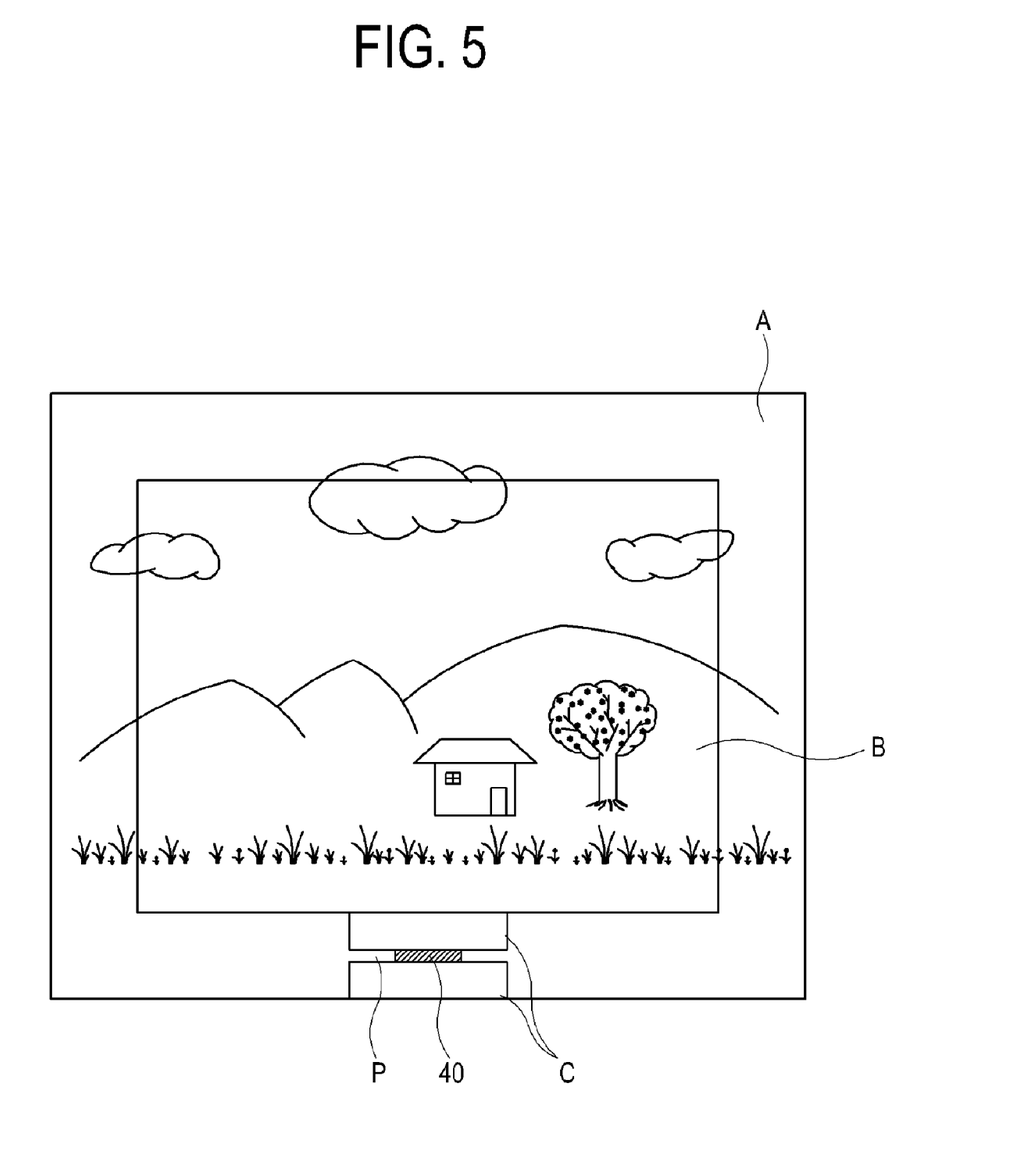
FIG. 5 illustrates a state that the sensing part senses the position determining pattern, according to an exemplary embodiment of the present invention.

The picture including the position determining pattern P may be displayed on the display part 30, as shown in FIG. 5.

The control part 50 controls the sensing part 40 to sense the position determining pattern P displayed on the display part 30. The sensing part 40 provides information on the characteristic of the position determining pattern P sensed through the sensing gap formed between the pair of light shields C to the control part 50.

The control part 50 determines the characteristic of the position determining pattern P sensed by the sensing part 40 on the basis of the information provided from the sensing part 40. For example, if the position determining pattern P has the plurality of parts each having different brightness levels, as shown in FIG. 2A or 2B, the control part 50 determines the brightness level sensed by the sensing part 40 among the different brightness levels.

Then, the control part 50 determines whether the sensed characteristic is equal to a predetermined reference characteristic or not. If it is determined that the sensed characteristic is not equal to the reference characteristic, the control part 50 determines a shift between the sensed characteristic and the reference characteristic. Here, the reference characteristic may be predetermined to correspond to the characteristic of the center of the position determining pattern P.

The control part 50 may include a memory part (not shown) to store therein information on the shift between the characteristic of each part of the position determining pattern P, and determine the information on the shift between the characteristic sensed by the sensing part 40 and the reference characteristic.

The control part 50 adjusts the position of the picture displayed on the display part 30 on the basis of the information, for example, so that the center of the picture is positioned at the center of the display part 30.

Hereinafter, a control method of the display apparatus according to the exemplary embodiment of the present invention will be described by referring to FIG. 6.

Figure 6:
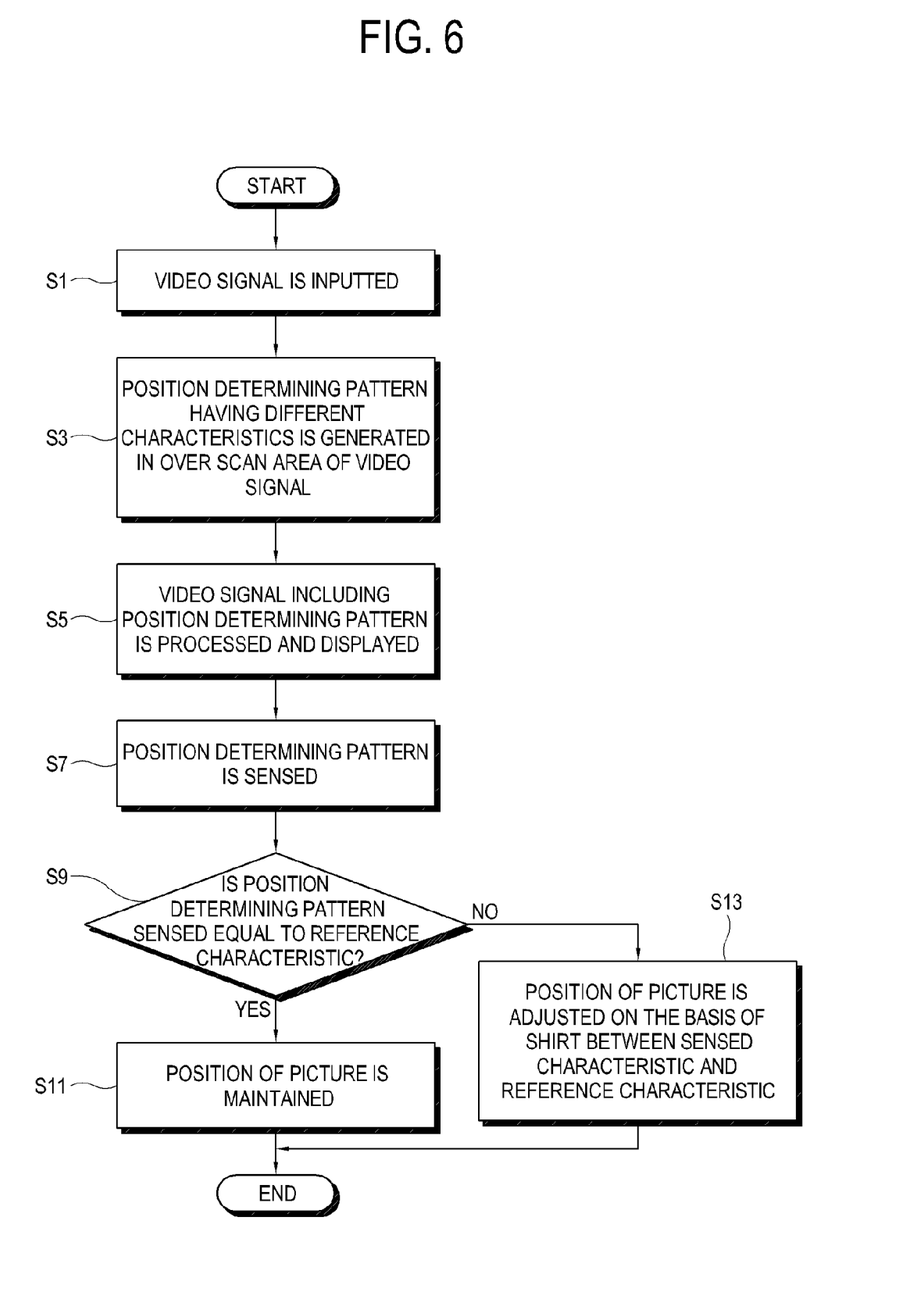
FIG. 6 illustrates a control process of the display apparatus according to an exemplary embodiment of the present invention.

As shown in FIG. 6, if a video signal is inputted (S1), the control part 50 controls the pattern generating part 25 to generate a position determining pattern P having a plurality of parts each having different characteristics in an over scan area A of the video signal (S3).

Then, if the video signal including the position determining pattern P is processed and displayed (S5), the control part 50 controls the sensing part 40 to sense the position determining pattern P (S7).

Then, it is determined whether the characteristic sensed by the sensing part 40 among the different characteristics of the position determining pattern P is equal to a predetermined reference characteristic (S9).

If it is determined that the sensed characteristic is equal to the reference characteristic, it is determined that the center of the picture displayed on the display part 30 is positioned at the center of the display part 30, and thus, the picture is maintained in its original place (S11).

On the other hand, if it is determined that the sensed characteristic is not equal to the reference characteristic, the position of the picture is adjusted on the basis of the shift between the sensed characteristic and the reference characteristic (S13).

As described above, according to an aspect of the present invention, it is determined whether the center of a picture is positioned at the center of a display part by means of a position determining pattern of a face shape, and thus, the position of the picture can be quickly determined and adjusted.

Further, because the position determining pattern has a plurality of parts each having different characteristics and a shift between each characteristic and a predetermined reference characteristic can be determined, the shift between the center of the picture and the center of the display part can be correctly determined, and thus, the position of the picture can correctly adjusted.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
    a signal processing part which processes a video signal including at a peripheral area thereof a position determining pattern having a plurality of characteristics;
    a display part which displays a picture on the basis of the video signal processed by the signal processing part;
    a sensing part which senses the position determining pattern which is included in the video signal; and
    a control part which controls the signal processing part to adjust a position of the picture displayed on the display part and to position a center of the picture at a center of the display part, on the basis of a shift between a characteristic sensed by the sensing part among the plurality of characteristics of the position determining pattern and a predetermined reference characteristic;
    wherein the position determining pattern is two-dimensional and comprises parts with different brightness levels at regular intervals which change gradually going downward or rightward.

2. The display apparatus according to claim 1, wherein the signal processing part comprises a pattern generating part which generates the position determining pattern, and
    wherein the control part controls the pattern generating part to generate the position determining pattern in an over scan area of the video signal.

3. The display apparatus according to claim 2, further comprising: a memory part which stores information on the shift between each characteristic of the position determining pattern and the reference characteristic,
    wherein the control part determines the information on the shift between the characteristic of the position determining pattern sensed by the sensing part and the reference characteristic from the memory part, and adjusts the position of the picture displayed on the display part on the basis of the determined information.

4. The display apparatus according to claim 1, wherein the signal processing part comprises a pattern generating part which generates the position determining pattern, and
    wherein the control part controls the pattern generating part to generate the position determining pattern in an over scan area of the video signal.

5. The display apparatus according to claim 4, further comprising: a memory part which stores information on the shift between each characteristic of the position determining pattern and the reference characteristic,
    wherein the control part determines the information on the shift between the characteristic of the position determining pattern sensed by the sensing part and the reference characteristic from the memory part, and adjusts the position of the picture displayed on the display part on the basis of the determined information.

6. The display apparatus according to claim 1, wherein the sensing part has a light shield structure to form a sensing gap.

7. A method of controlling a display apparatus, comprising:
    processing a video signal including at a peripheral area thereof a position determining pattern having a plurality of characteristics;
    displaying a picture on the basis of the processed video signal;
    sensing the position determining pattern; and adjusting a position of the picture and positioning a center of the picture at a center of a screen on the basis of a shift between a sensed characteristic among the plurality of characteristics of the position determining pattern and a predetermined reference characteristic;

wherein the position determining pattern is two-dimensional and comprises parts with different brightness levels at regular intervals which change gradually going downward or rightward.

8. The method according to claim 7, wherein the processing the video signal comprises generating at least one position determining pattern in an over scan area of the video signal.

9. The method according to claim 8, further comprising: storing information on the shift between each characteristic of the position determining pattern and the reference characteristic, wherein the adjusting the position of the picture comprises: determining the information on the shift between the sensed characteristic of the position determining pattern and the reference characteristic; and adjusting the position of the picture on the basis of the determined information.

10. The method according to claim 7, wherein the processing the video signal comprises generating at least one position determining pattern in an over scan area of the video signal.

11. The method according to claim 10, further comprising: storing information on the shift between each characteristic of the position determining pattern and the reference characteristic, wherein the adjusting the position of the picture comprises: determining the information on the shift between the sensed characteristic of the position determining pattern and the reference characteristic; and adjusting the position of the picture on the basis of the determined information.

* * * * *